(12) United States Patent
Takamatsu

(10) Patent No.: US 11,283,329 B2
(45) Date of Patent: Mar. 22, 2022

(54) DRIVE APPARATUS AND MOVING OBJECT

(71) Applicant: SONY CORPORATION, Tokyo (JP)

(72) Inventor: Takashi Takamatsu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/964,590

(22) PCT Filed: Jan. 11, 2019

(86) PCT No.: PCT/JP2019/000757
§ 371 (c)(1),
(2) Date: Jul. 23, 2020

(87) PCT Pub. No.: WO2019/155822
PCT Pub. Date: Aug. 15, 2019

(65) Prior Publication Data
US 2021/0044176 A1 Feb. 11, 2021

(30) Foreign Application Priority Data
Feb. 7, 2018 (JP) ............................ JP2018-019803

(51) Int. Cl.
*H02K 7/116* (2006.01)
*B62M 11/14* (2006.01)
(Continued)

(52) U.S. Cl.
CPC .............. *H02K 7/116* (2013.01); *B62M 11/14* (2013.01); *B60K 7/0007* (2013.01);
(Continued)

(58) Field of Classification Search
CPC .................................. H02K 7/116; B62M 11/14
See application file for complete search history.

(56) References Cited

U.S. PATENT DOCUMENTS

2015/0133253 A1* 5/2015 Huang ................. B60K 7/0007
475/149
2017/0257004 A1 9/2017 Huang

FOREIGN PATENT DOCUMENTS

CN 201781372 U 3/2011
CN 104638829 A 5/2015
(Continued)

OTHER PUBLICATIONS

International Search Report and Written Opinion of PCT Application No. PCT/JP2019/000757, dated Apr. 16, 2019, 13 pages of ISRWO.

(Continued)

*Primary Examiner* — Huan Le
(74) *Attorney, Agent, or Firm* — Chip Law Group

(57) ABSTRACT

A drive apparatus according to an embodiment of the present technology includes: a generation unit; a gear unit; a rotation unit; and a housing unit. The generation unit generates a rotational force acting around a predetermined axis as a center of rotation. The gear unit includes one or more gears, decelerates the generated rotational force, and transmits the decelerated rotational force. The rotation unit includes a wheel unit and a tire, the wheel unit being directly connected to a gear included in the gear unit and being caused to rotate by the decelerated rotational force, the tire being supported by the wheel unit. The housing unit houses the generation unit by a pair of cover units divided in an axial direction of the predetermined axis.

13 Claims, 5 Drawing Sheets

(51) Int. Cl.
*B60K 7/00* (2006.01)
*B62K 3/00* (2006.01)

(52) U.S. Cl.
CPC ......... *B60Y 2200/126* (2013.01); *B62K 3/002* (2013.01); *B62K 2202/00* (2013.01)

(56) References Cited

FOREIGN PATENT DOCUMENTS

| | | |
|---|---|---|
| CN | 204334222 U | 5/2015 |
| CN | 106230217 A | 12/2016 |
| CN | 206187268 U | 5/2017 |
| CN | 206734501 U | 12/2017 |
| EP | 3068650 A1 | 9/2016 |
| JP | 08-282574 A | 10/1996 |
| WO | 2015/073685 A1 | 5/2015 |

OTHER PUBLICATIONS

Office Action for CN Patent Application No. 201980011290.0, dated Aug. 4, 2021, 5 pages of Office Action and 9 pages of English Translation.

\* cited by examiner

DRIVE APPARATUS AND MOVING OBJECT

CROSS REFERENCE TO RELATED APPLICATIONS

This application is a U.S. National Phase of International Patent Application No. PCT/JP2019/000757 filed on Jan. 11, 2019, which claims priority benefit of Japanese Patent Application No. JP 2018-019803 filed in the Japan Patent Office on Feb. 7, 2018. Each of the above-referenced applications is hereby incorporated herein by reference in its entirety.

TECHNICAL FIELD

The present technology relates to a drive apparatus and a moving object that are applicable to rotation control of drive wheels, and the like.

BACKGROUND ART

Patent Literature 1 discloses a technology relating to a drive mechanism of a bicycle with an electric motor. In the drive mechanism shown in FIG. 5 of Patent Literature 1, an electric motor and a planetary speed reducer that decelerates the output of the electric motor are disposed in a rear hub of the bicycle. By transmitting the output of the planetary speed reducer to the rear hub, a rear tire is driven to rotate (e.g., paragraphs [0055] to [0061] of the specification of Patent Literature 1).

CITATION LIST

Patent Literature

Patent Literature 1: Japanese Patent Application Laid-open No. 1996-282574

DISCLOSURE OF INVENTION

Technical Problem

A drive apparatus that is applicable to such rotation control of drive wheels, and the like, has favorable assemblability, and is capable of exhibiting high drive accuracy is desired.

In view of the circumstances as described above, it is an object of the present technology to provide a drive apparatus and a moving object that have favorable assemblability and are capable of exhibiting high drive accuracy.

Solution to Problem

In order to achieve the above-mentioned object, a drive apparatus according to an embodiment of the present technology includes: a generation unit; a gear unit; a rotation unit; and a housing unit.

The generation unit generates a rotational force acting around a predetermined axis as a center of rotation.

The gear unit includes one or more gears, decelerates the generated rotational force, and transmits the decelerated rotational force.

The rotation unit includes a wheel unit and a tire, the wheel unit being directly connected to a gear included in the gear unit and being caused to rotate by the decelerated rotational force, the tire being supported by the wheel unit.

The housing unit houses the generation unit by a pair of cover units divided in an axial direction of the predetermined axis.

In this drive apparatus, the gear included in the gear unit that decelerates a rotational force and transmits the decelerated rotational force and the wheel unit that supports the tire are directly connected to each other. Further, the generation unit is housed by the pair of cover units divided in the axial direction as the center of rotation of the rotational force. As a result, the assemblability is improved and it is possible to exhibit high drive accuracy.

The pair of cover units may be connected to at least one of the wheel unit or the gear directly connected to the wheel unit to house the generation unit.

The wheel unit may rotate around the predetermined axis as a center of rotation.

The generation unit may include a rotational shaft and generate the rotational force by causing the rotational shaft to rotate. In this case, the gear unit may include a first gear and a second gear, the first gear being connected to the rotational shaft, the second gear outputting the decelerated rotational force. Further, the wheel unit may include a connection unit directly connected to the second gear.

The gear unit may include a sun gear that is the first gear, an internal gear that is the second gear, and a plurality of planetary gears engaged with the sun gear and the internal gear. In this case, the connection unit may be directly connected to the internal gear.

The wheel unit may have an outer peripheral surface having a cylindrical shape centered on the predetermined axis. In this case, the tire may be connected to the outer peripheral surface.

The wheel unit may function as a part of the housing unit.

The pair of cover units may include a first cover unit and a second cover unit, the first cover unit being connected to the wheel unit on a first side in the axial direction of the predetermined axis, the second cover unit being connected to the wheel unit on a second side opposite to the first side.

The housing unit may rotate integrally with the wheel unit.

The housing unit may have an outer peripheral surface having a cylindrical shape centered on the predetermined axis. In this case, the tire may be disposed along the outer peripheral surface of the housing unit.

The drive apparatus may be configured as an in-wheel motor drive apparatus.

The generation unit may be a motor including a rotational shaft, generate the rotational force by causing the rotational shaft to rotate, and be configured as an in-wheel motor.

A moving object according to an embodiment of the present technology includes: the generation unit; the gear unit; the rotation unit; the housing unit; and a control unit.

The control unit controls generation of the rotational force by the generation unit.

Advantageous Effects of Invention

As described above, in accordance with the present technology, it is possible to realize a drive apparatus and a moving object that have favorable assemblability and are capable of exhibiting high drive accuracy. It should be noted that the effect described here is not necessarily limitative and may be any effect described in the present disclosure.

MODE(S) FOR CARRYING OUT THE INVENTION

Hereinafter, an embodiment of the present technology will be described with reference to the drawings.

[Configuration of Electric Kick Skater]

Figure 1:
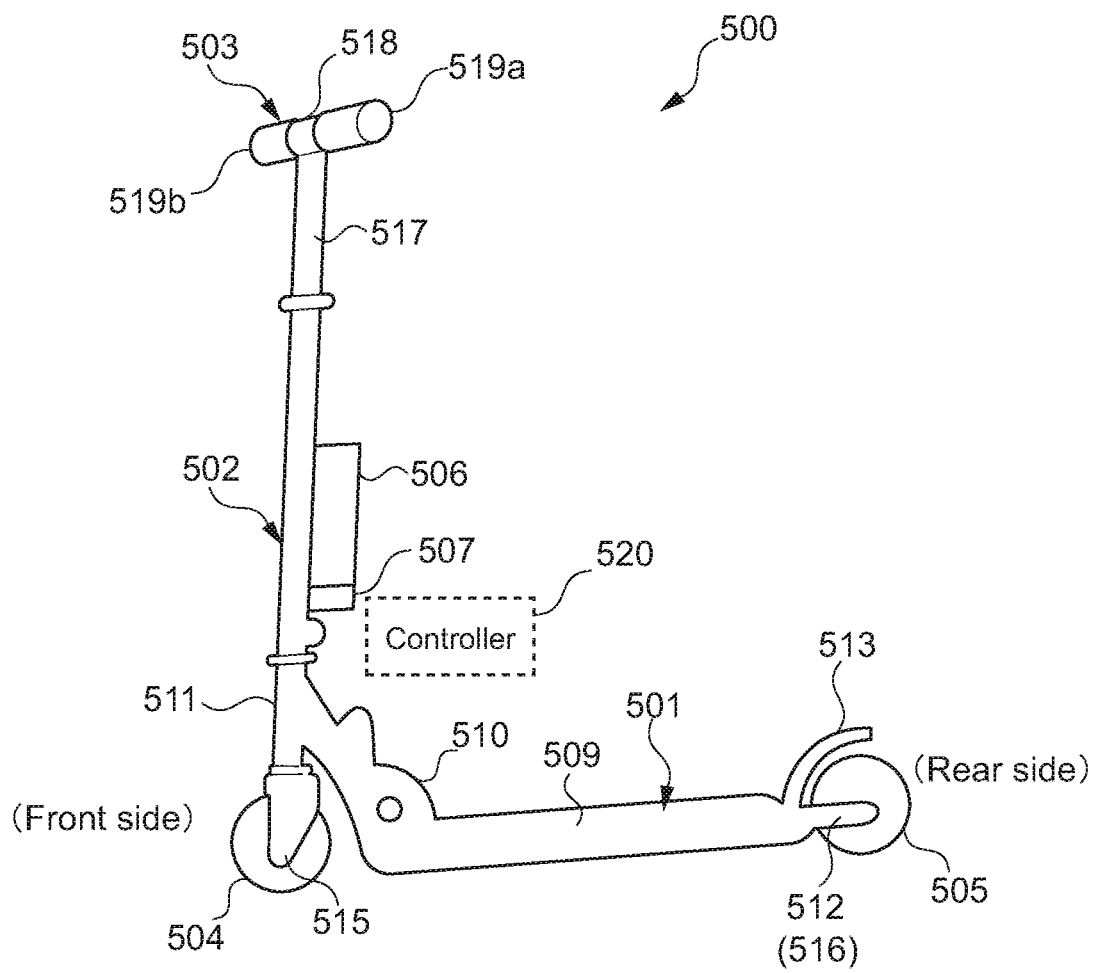
FIG. 1 is a schematic diagram showing a configuration example of an electric kick skater according to an embodiment of the present technology.

FIG. 1 is a schematic diagram showing a configuration example of an electric kick skater (hereinafter, referred to simply as a kick skater) according to an embodiment of the present technology. A kick skater 500 corresponds to an embodiment of a moving object according to the present technology.

The kick skater 500 includes a board unit 501, a handle support unit 502, a handle unit 503, a front wheel 504, a rear wheel 505, a battery 506, and a control box 507. As shown in FIG. 1, the side on which the handle unit 503 is provided is the front side of the kick skater 500, and the side opposite thereto is the rear side.

The board unit 501 includes a board 509, a folding mechanism 510, a front wheel support unit 511, a rear wheel support unit 512, and a foot brake 513. The board 509 is a portion on which a user puts one foot or both feet and has a substantially plate shape extending in the front-rear direction.

The folding mechanism 510 is connected to the front end portion of the board 509. The front wheel support unit 511 is connected to the side of the folding mechanism 510 opposite to the side connected to the board 509. The front wheel support unit 511 includes a hollow frame that extends in the vertical direction.

The folding mechanism 510 is configured to be capable of folding the kick skater 500. Specifically, the folding mechanism 510 is configured to be capable of causing the board 509 to relatively rotate toward the front wheel support unit 511 so that the extension direction of the board 509 and the extension direction of the front wheel support unit 511 are equal to each other. The specific configuration of the folding mechanism 510 is not limited, and may be arbitrarily designed.

Two support members 515 (only one support member 515 is shown in the figure) facing each other with a space therebetween are provided at the lower end of the front wheel support unit 511. The front wheel 514 is rotatably supported so as to be sandwiched between the two support members 515.

The rear wheel support unit 512 is connected to the rear end portion of the board 509. The rear wheel support unit 512 includes support members 516 (only one support member 516 is shown in the figure) facing each other with a space therebetween are provided. The rear wheel 505 is rotatably supported so as to be sandwiched between the two support members 516.

The foot brake 513 is disposed at the rear end portion of the board 509 so as to cover the upper side of the rear wheel 505. The user can apply the brake by stepping on the foot brake 513 with her/his foot to press it against the rear wheel 505. Note that the foot brake 513 can have a mudguard function.

The handle support unit 502 includes a hollow frame that extends in the vertical direction and is inserted into the front wheel support unit 511 and fixed.

The handle unit 503 has a substantially T-shape, and includes a frame 517 that extends in the vertical direction and a handle 518 that extends in the right and left direction as viewed from the user. The frame 517 is inserted into the handle support unit 502 and fixed. At this time, the height, angle, and the like of the handle 518 can be adjusted, and the handle unit 503 may be fixed after the adjustment is completed.

The handle 518 includes a left grip 519a to be held by the left hand and a right grip 519b to be held by the right hand. In this embodiment, the right grip 519b functions as an accelerator grip. The user can perform accelerator operation by causing the right grip 519b to rotate.

The battery 506 and the control box 507 are attached to the handle support unit 502. The battery 506 is configured to be attachable/detachable to/from the control box 507. The battery 506 is attached when the kick skater 500 is used, and the battery 506 is removed when charging or the like is performed. Note that the kick skater 500 can be moved forward by, for example, kicking the ground, without attaching the battery 506.

A controller 520 schematically illustrated by a broken line block, various circuits such as a power supply circuit and a drive circuit (illustration omitted), and the like are configured in the control box 507. The controller 520 includes a CPU, a ROM, and the like, and controls the rotational drive of the front wheel 504 that functions as a drive wheel. Specifically, the controller 520 controls the power supply to the in-wheel motor described below. As a result, it is possible to control generation of the rotational force by the in-wheel motor.

The controller 520 causes the front wheel 504 to be driven to rotate in accordance with the accelerator operation in which the right grip 519b is caused to rotate. As a result, it is possible to cause the kick skater 500 to move forward. The specific configuration of the controller 520 is not limited, and may be arbitrarily designed. In this embodiment, the controller 520 functions as a control unit.

The configuration of the kick skater 500 shown in FIG. 1 is merely an embodiment, and other arbitrary configurations may be adopted for the overall shape and the respective units. For example, the position where the battery 506 or the control box 507 is attached, the configuration for inputting the accelerator operation, and the like may be arbitrarily designed. The present technology is applicable to an arbitrary kick skater including the front wheel or the rear wheel or both of them as drive wheels.

[In-Wheel Motor Drive Apparatus]

In this embodiment, an in-wheel motor drive apparatus is used for the front wheel 504 that is a drive wheel. The in-wheel motor drive apparatus is an apparatus that includes a motor disposed inside or in the vicinity of a wheel, which supports a tire, or inside or in the vicinity of a hub and directly causes the wheel or the hub to be driven to rotate. The in-wheel motor drive apparatus can be referred to also as an in-wheel motor type drive apparatus.

In the present disclosure, the motor included in the in-wheel motor drive apparatus will be described as an in-wheel motor. Note that the in-wheel motor drive apparatus itself may be referred to as an in-wheel motor and used in some cases.

Figure 2:
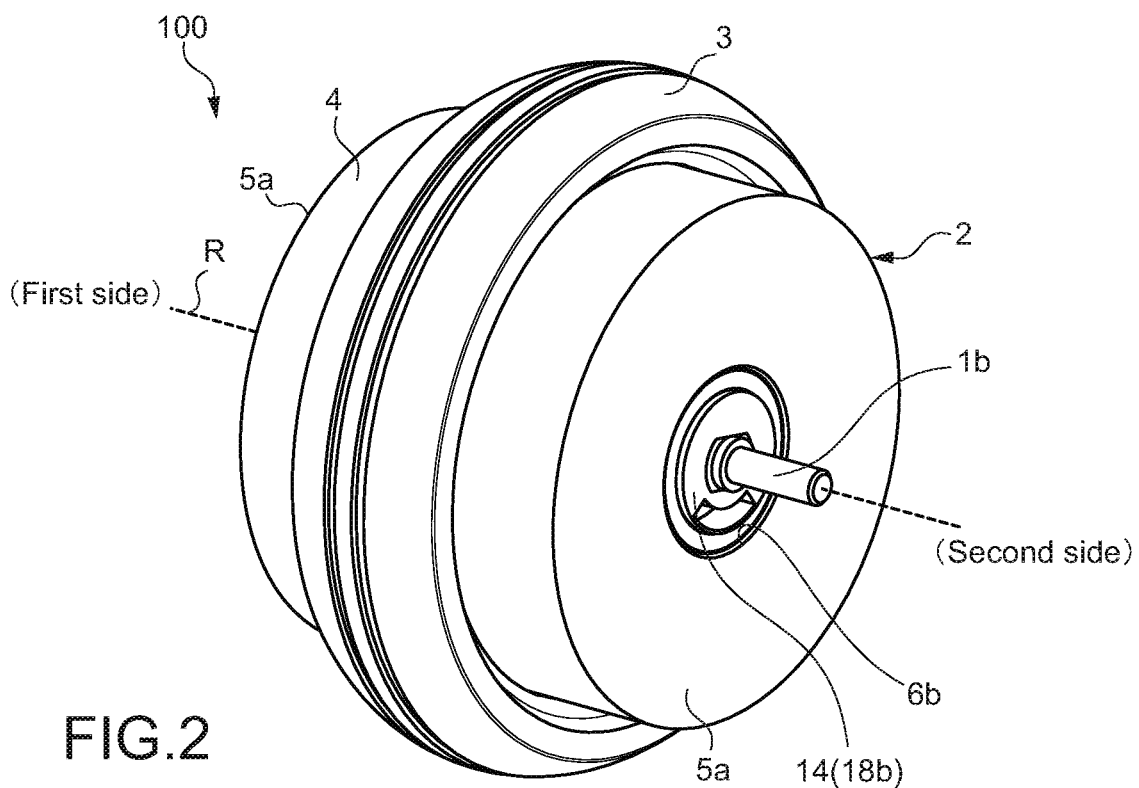
FIG. 2 is a perspective view showing an example of the appearance of an in-wheel motor drive apparatus.
Figure 3:
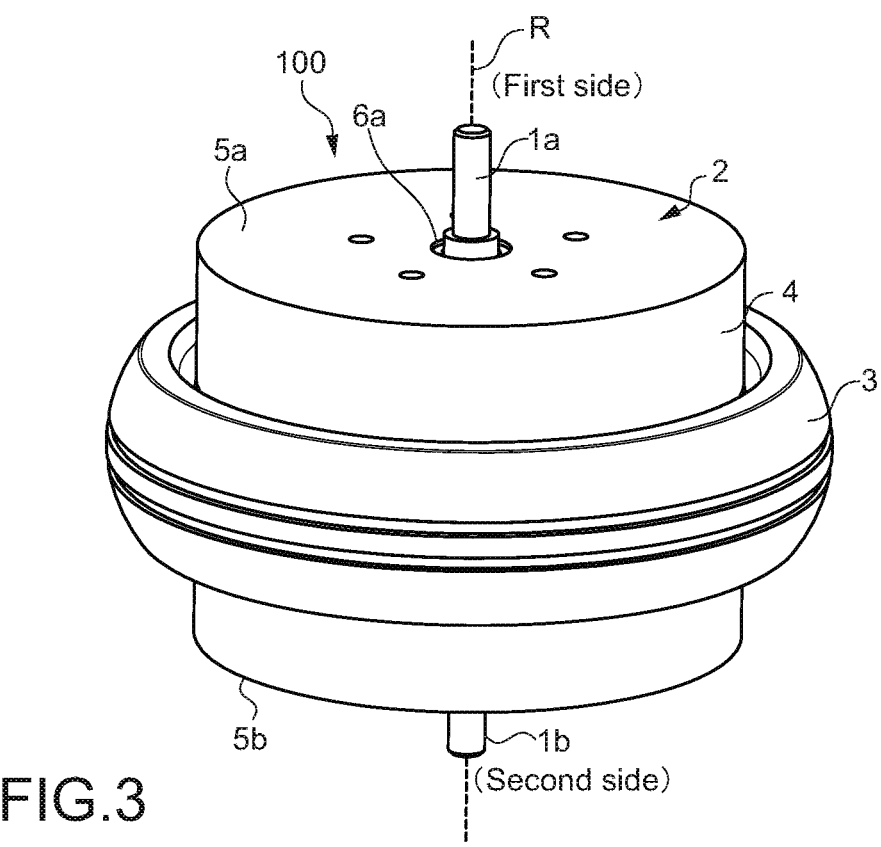
FIG. 3 is a perspective view showing an example of the appearance of the in-wheel motor drive apparatus.

FIG. 2 and FIG. 3 are each a perspective view showing an example of the appearance of an in-wheel motor drive apparatus 100. FIG. 2 and FIG. 3 are each a diagram of the in-wheel motor drive apparatus 100 as viewed from different orientations.

As shown in FIG. 2 and FIG. 3, the in-wheel motor drive apparatus 100 includes fixed shafts 1a and 1b, a housing 2, and a tire 3.

The fixed shafts 1a and 1b are disposed such that the extension directions thereof are equal to each other and they are aligned on the same straight line. In other words, the fixed shafts 1a and 1b are disposed such that the extended line extending the fixed shaft 1a and the extended line extending the fixed shaft 1b overlap on the same straight line.

As shown in FIG. 2 and FIG. 3, an imaginary line on which the fixed shafts 1a and 1b are disposed is defined as an axis R. The in-wheel motor drive apparatus 100 is driven to rotate around the axis R as the center of rotation. In this embodiment, the axis R corresponds to a predetermined axis.

Hereinafter, the axis R will be described as a rotation center axis R. Further, in the axial direction of the rotation center axis R, one side of the in-wheel motor drive apparatus 100 will be described as a first side and the side opposite to the first side will be referred to as a second side.

Note that the fixed shafts 1a and 1b are connected to a motor housing 14 of a motor (in-wheel motor) 10 described below and fixed.

The housing 2 has a substantially cylindrical hollow shape centered on the rotation center axis R. The housing 2 houses the motor 10 described below and a gear mechanism 30 inside. As shown in FIG. 1 and FIG. 2, the housing 2 includes an outer peripheral surface 4 having a cylindrical shape centered on the rotation center axis R, and flat surface portions 5a and 5b that are located at both ends of the outer peripheral surface 4 and has a substantially circular shape.

As shown in FIG. 2, a through hole 6b is formed at the center of the flat surface portion 5b and an end portion (second protruding portion 18b) of the motor housing 14 to which the fixed shaft 1b is connected is disposed in that portion. A bearing or the like is disposed between the end portion of the motor housing 14 and the edge portion of the through hole 6b, and the housing 2 is configured to be rotatable with respect to the motor housing 14.

As shown in FIG. 3, a through hole 6a is formed at the center of the flat surface portion 5a and the fixed shaft 1a is disposed in that portion. A bearing or the like is disposed between the fixed shaft 1a and the through hole 6a, and the housing 2 is configured to be rotatable with respect to the fixed shaft 1ab. Therefore, the housing 2 is configured to be rotatable with respect to the fixed shafts 1a and 1b.

The tire 3 is disposed such that the radial direction thereof is perpendicular to the rotation center axis R with the rotation center axis R as the center. The tire 3 is disposed along the outer peripheral surface 4 of the housing 2 at the substantially center position between the two flat surface portions 5a and 5b of the housing 2. The surface shape, material, and the like of the tire 3 are not limited, and may be arbitrarily designed.

The two fixed shafts 1a and 1b are fixed to the two support members 515 provided at the lower end of the front wheel support unit 511 shown in FIG. 1. When electric power is supplied to the in-wheel motor drive apparatus 100, the housing 2 and the tire 3 integrally rotate around the rotation center axis R as the center of rotation. This makes it possible for the front wheel 504 to function as a drive wheel.

Figure 4:
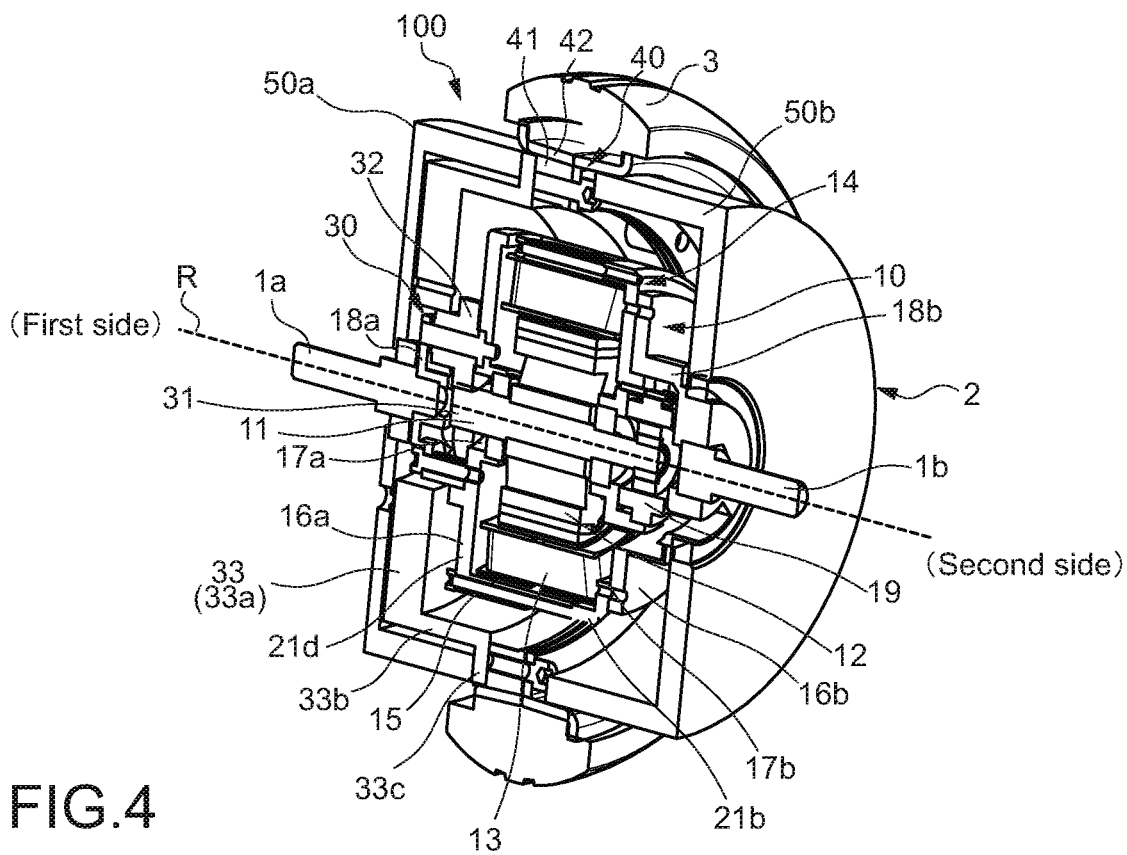
FIG. 4 is a cross-sectional view showing an internal configuration example of the in-wheel motor drive apparatus.
Figure 5:
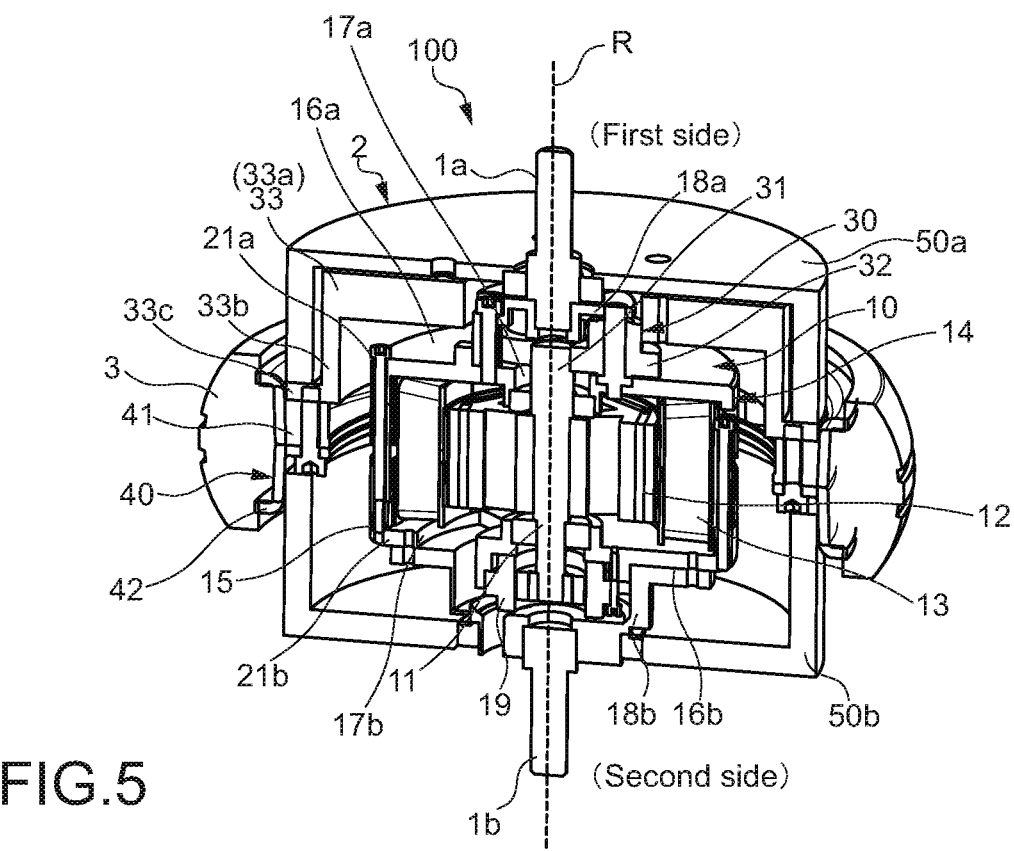
FIG. 5 is a cross-sectional view showing an internal configuration example of the in-wheel motor drive apparatus.

FIG. 4 to FIG. 7 are each a cross-sectional view showing an internal configuration example of the in-wheel motor drive apparatus 100. FIG. 4 is a cross-sectional view of the in-wheel motor drive apparatus 100 shown in FIG. 2 cut along the center from the upper side to the lower side. FIG. 5 is a cross-sectional view of the in-wheel motor drive apparatus 100 shown in FIG. 3 cut along the center from the upper side to the lower side. Note that hatching representing the cross section is omitted in FIG. 4 and FIG. 5.

Figure 6:
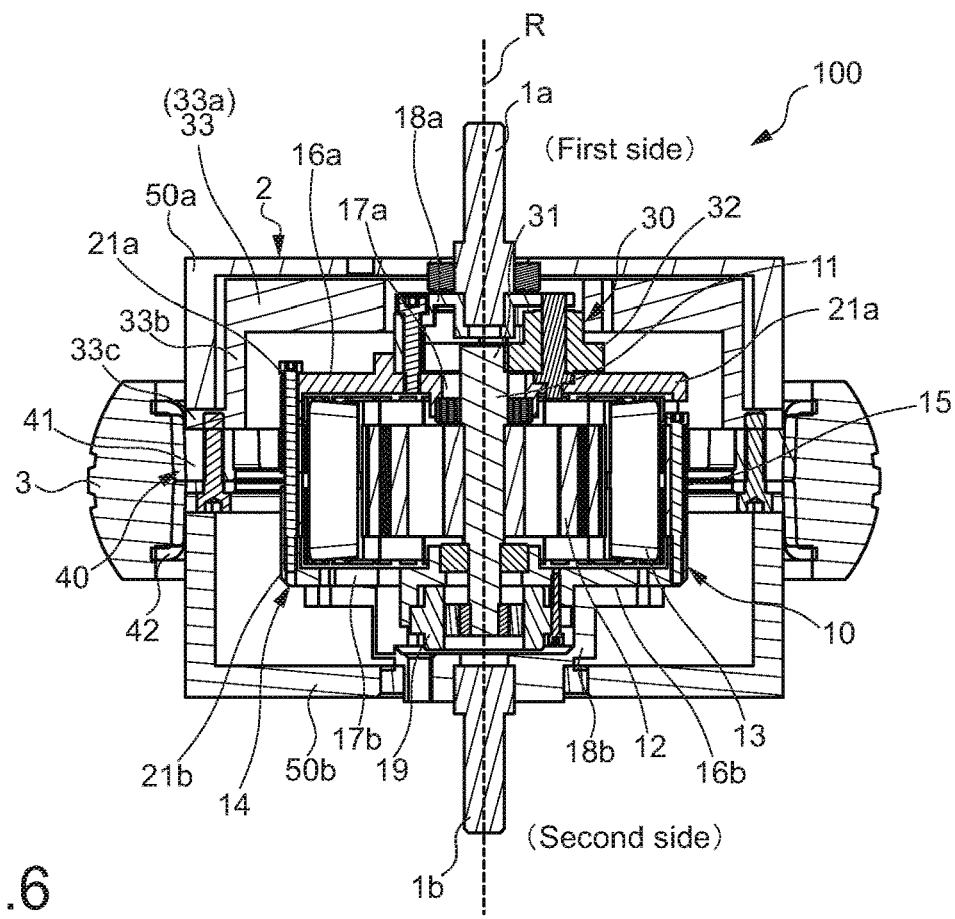
FIG. 6 is a cross-sectional view showing an internal configuration example of the in-wheel motor drive apparatus.
Figure 7:
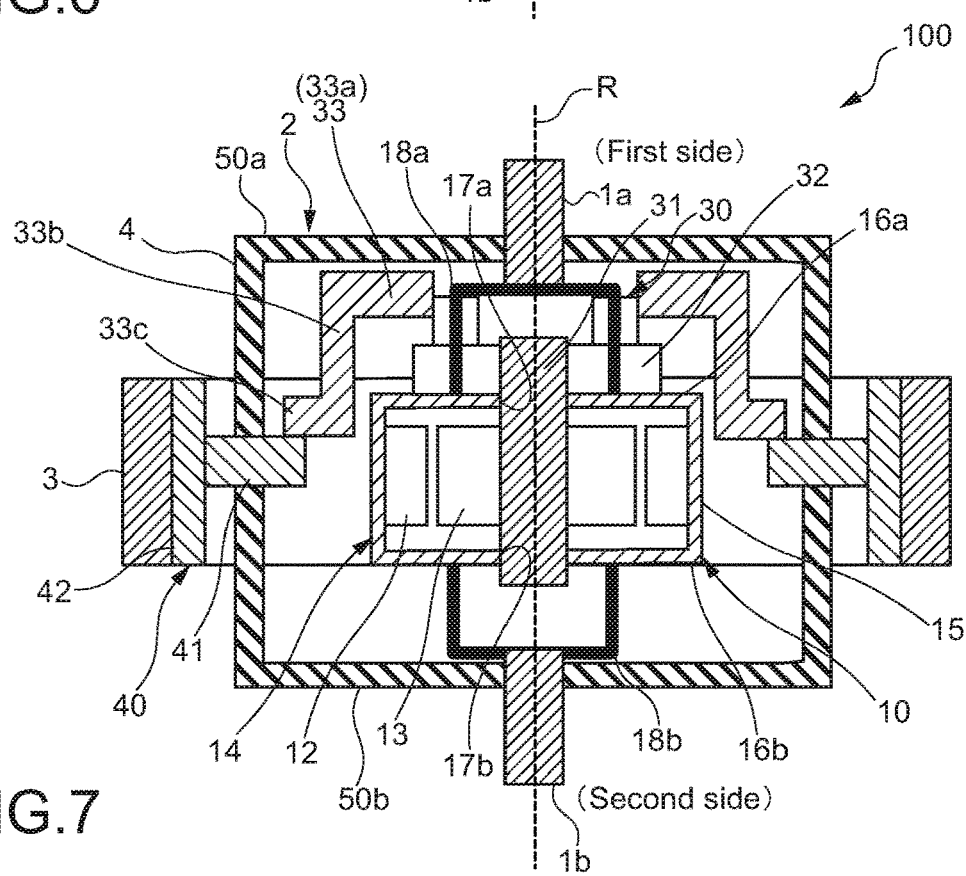
FIG. 7 is a cross-sectional view showing an internal configuration example of the in-wheel motor drive apparatus (schematic diagram).

FIG. 6 is a front view of the cross section of the in-wheel motor drive apparatus 100. FIG. 7 is a diagram showing the simplified cross section of the in-wheel motor drive apparatus 100 shown in FIG. 6 for easy understanding of description. In FIG. 7, illustration of the members shown in FIG. 2 to FIG. 6 is omitted as appropriate.

Regarding the reference symbols indicating the respective units, the drawings are appropriately selected and shown so that the drawings are not complicated. That is, there are drawings in which a reference symbol is given to a part and drawings in which no reference symbol is given to the same part.

As shown in FIG. 4 to FIG. 7 and the like, the in-wheel motor drive apparatus 100 further includes the motor 10, the gear mechanism 30, a wheel 40, a first cover 50a, a second cover 50b.

The motor 10 is an inner rotor type motor, and includes a rotational shaft 11, a rotor 12, a stator 13, and the motor housing 14.

The rotational shaft 11 is rotatably disposed on the rotation center axis R. The rotor 12 has a substantially cylindrical shape centered on the rotation center axis R, and a magnet is embedded in the side surface portion facing the stator 13. The rotational shaft 11 is fixed to the center of the rotor 12 and the rotor 12 and the rotational shaft 11 are capable of integrally rotating.

The stator 13 has a substantially cylindrical shape centered on the rotation center axis R, and is configured to cover the side surface portion of the rotor 12. A coil is wound around the stator 13 and functions as a motor coil.

The motor housing 14 houses the rotational shaft 11, the rotor 12, and the stator 13 inside. The motor housing 14 has a substantially cylindrical shape with the rotation center axis R as the center, and includes a side surface 15 having a cylindrical shape and two flat surface portions 16a and 16b each having a substantially circular shape.

A through hole 17a is formed at the center of the flat surface portion 16a located on the first side, and the end portion of the rotational shaft 11 on the first side is inserted so as to protrude from the through hole 17a to the first side. The rotational shaft 11 is rotatably connected to the motor housing 14 via a bearing or the like.

Further, a first protruding portion 18a that protrudes to the first side is provided at the center of the flat surface portion 16a. The first protruding portion 18a is connected to the fixed shaft 1a and fixed. Further, the first protruding portion 18a has a function of holding a planetary gear 32 of the gear mechanism 30, which will be described below.

A through hole 17b is formed in an area including the center on the flat surface portion 16b located on the second side. Further, the second protruding portion 18b that protrudes to the second side is provided on the flat surface portion 16b so as to cover the through hole 17b. The second protruding portion 18b is connected to the fixed shaft 1b and fixed.

Further, a shaft support unit 19 is configured inside the second protruding portion 18b. The end portion of the rotational shaft 11 on the second side is rotatably connected to the shaft support unit 19 via a bearing or the like. Note that in the schematic diagram of FIG. 7, the rotational shaft 11 is rotatably connected to the through hole 17b of the flat surface portion 16b.

The stator 13 (motor coil) of the motor 10 is fixed to the inside of the side surface 15 of the motor housing 14. When current is supplied to the motor coil, the rotor 12 and the rotational shaft 11 integrally rotate with respect to the motor housing 14 connected to the fixed shafts 1a and 1b. As a result, a rotational force acting around the rotation center axis R as a center of rotation is generated. In this embodiment, the motor 10 corresponds to a generation unit that generates a rotational force acting around the rotation center axis R.

Note that the motor housing 14 includes a plurality of members. In this embodiment, a first housing member 21a that includes the flat surface portion 16a on the first side and a second housing member 21b that includes the flat surface portion 16b on the second side constitute the motor housing 14.

The first and second housing members 21a and 21b are connected to each other at the substantially central portion in the axial direction of the rotation center axis R. The method of connecting the first and second housing members 21a and 21b to each other, the method of connecting the first housing member 21a and the first protruding portion 18a to each other, and the method of connecting the second housing member 21b and the second protruding portion 18b to each other are not limited. An arbitrary method such as fastening via a vis, screw, or the like, and adhesion using an adhesive or the like may be adopted.

Since the motor housing 14 includes a plurality of members, it is possible to improve the assemblability of the in-wheel motor drive apparatus 100. It goes without saying that another connection member of the like may be disposed between the first and second housing members 21a and 21b.

Figure 8:
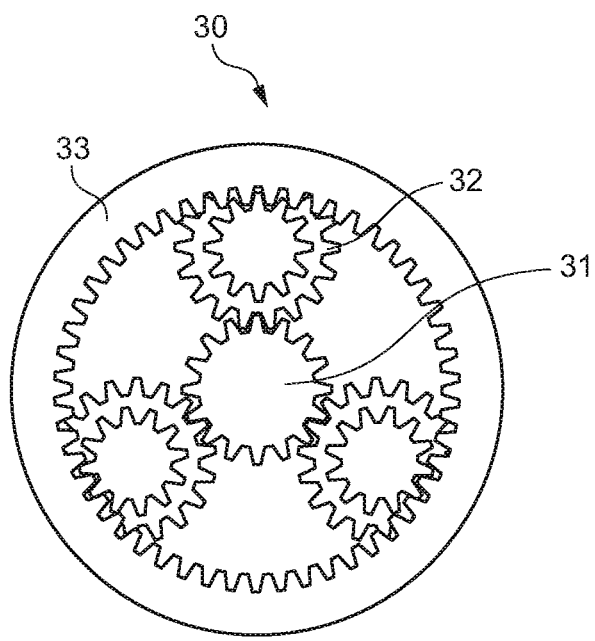
FIG. 8 is a schematic diagram of a gear mechanism as viewed from a first side.

FIG. 8 is a schematic diagram for describing a configuration example of the gear mechanism 30. The gear mechanism 30 decelerates the rotational force that has been generated by the motor 10 and acts around the rotation center axis R as the center of rotation, and transmits the decelerated rotational force. In this embodiment, the gear mechanism 30 corresponds to a gear unit that includes one or more gears, decelerates the generated rotational force, and transmits the decelerated rotational force.

FIG. 8 is a schematic diagram of the gear mechanism 30 as viewed from the first side. In this embodiment, a planetary gear mechanism is configured as the gear mechanism 30. The gear mechanism 30 includes a sun gear 31, three planetary gears 32, and an internal gear 33.

As shown in FIG. 4 to FIG. 7, the sun gear 31 is formed at the end portion of the rotational shaft 11 on the first side. The sun gear 31 and the rotational shaft 11 may be integrally formed, or the sun gear 31 may be connected to the end portion of the rotational shaft 11.

The three planetary gears 32 are arranged around the sun gear 31 at substantially equal intervals. The planetary gears 32 are rotatably held between the flat surface portion 16a of the motor housing 14 and the first protruding portion 18a.

As shown in FIG. 4 to FIG. 8, the planetary gears 32 are each a two-stage gear. The first-stage gear located on the first side is engaged with the sun gear 31. The second-stage gear of each of the three planetary gears 32 is engaged with the internal gear 33.

Rotation of the rotational shaft 11 of the motor 10 generates a rotational force, which causes the sun gear 31 to rotate. The planetary gear mechanism including the sun gear 31, the three planetary gears 32, and the internal gear 33 decelerates the rotational force and transmits the decelerated rotational force. Then, the decelerated rotational force is output by the internal gear 33. In this embodiment, the sun gear 31 corresponds to the first gear and the internal gear 33 corresponds to the second gear.

As shown in FIG. 4 to FIG. 7, the internal gear 33 includes a flat surface portion 33a having a substantially circular shape centered on the rotation center axis R, gear teeth being formed on the center of the flat surface portion 33a, and a side surface portion 33b that extends from the peripheral edge of the flat surface portion 33a along the axial direction of the rotation center axis R. Further, the internal gear 33 includes a flange portion 33c that extends, in the outer peripheral direction, from the end portion of the side surface portion 33b on the second side. Note that in FIG. 8, only a portion on the internal gear 33 where the gear teeth are formed is schematically illustrated.

The wheel 40 includes a main body portion 41 having a substantially cylindrical shape centered on the rotation center axis R, and a tire support portion 42 provided on the outer peripheral side of the main body portion 41. The main body portion 41 is directly connected to the flange portion 33c of the internal gear 33 via a vis or the like and fixed. That is, the wheel 40 is directly connected to the internal gear 33 that is a gear included in the gear mechanism 30.

Therefore, when the internal gear 33 rotates, also the wheel 40 rotates integrally with the internal gear 33. That is, the wheel 40 rotates around the rotation center axis R as the center of rotation by the decelerated rotational force output by the internal gear 33. In this embodiment, the wheel 40 corresponds to a wheel unit and the main body portion 41 corresponds to a connection unit.

The tire 3 is connected to the tire support portion 42 of the wheel 40 and rotates integrally with the wheel 40. That is, the tire 3 is disposed along the outer peripheral surface 4 of the housing 2 by being supported by the wheel 40. Note that the tire support portion 42 corresponds to an outer peripheral circle having a cylindrical shape centered on the rotation center axis R.

In this embodiment, the wheel 40 and the tire 3 realize a rotation unit to be driven to rotate.

The first and second covers 50a and 50b are members constituting the housing 2, and each have a substantially cylindrical shape centered on the rotation center axis R, one surface thereof being open. The first cover 50a is a member including the flat surface portion 5a shown in FIG. 1 and FIG. 2. The second cover 50b is a member including the flat surface portion 5b shown in FIG. 1 and FIG. 2.

As shown in FIG. 4 to FIG. 7, the opening portion of the first cover 50a is connected to the flange portion 33c of the internal gear 33, which is connected to the first side of the main body portion 41 of the wheel 40, and fixed. The opening portion of the second cover 50b is connected to the second side of the main body portion 41 of the wheel 40, and fixed.

Therefore, in this embodiment, the first and second covers 50a and 50b, and the main body portion 41 of the wheel 40 constitute the housing 2. That is, the wheel 40 functions as a part of the housing 2 that houses the motor 10 and the gear mechanism 30.

Note that in this embodiment, the housing 2 corresponds to a housing unit. Further, the first and second covers 50a and 50b correspond to a pair of cover units (first and second cover unit) divided in the axial direction of the rotation center axis R.

Note that in FIG. 7, the first cover 50a is connected not to the flange portion 33c of the internal gear 33 but to the main body portion 41 of the wheel 40. That is, the main body portion 41 of the wheel 40 is provided so as to penetrate the outer peripheral surface 4 of the housing 2. Then, both the first and second covers 50a and 50b are connected to the main body portion 41 of the wheel 40. Such a configuration may be adopted. Also in this configuration, it can be said that the main body portion 41 of the wheel 40 functions as a part of the housing 2.

As described above, in the in-wheel motor drive apparatus 100 according to this embodiment, the internal gear 33 included in the gear mechanism 30 that decelerates the rotational force generated by the motor 10 and transmits the decelerated rotational force, and the wheel 40 that supports the tire 3 are directly connected to each other. Further, the motor 10 is housed by the first and second cover units 50a and 50b divided in the axial direction of the rotation center axis R. As a result, the assemblability is improved and it is possible to exhibit high drive accuracy.

Further, the first and second cover units 50a and 50b are connected to at least one of the wheel 40 or the internal gear 33 directly connected to the wheel 40 to house the motor 10. With such a configuration, high assemblability and high drive accuracy are exhibited.

Figure 9:
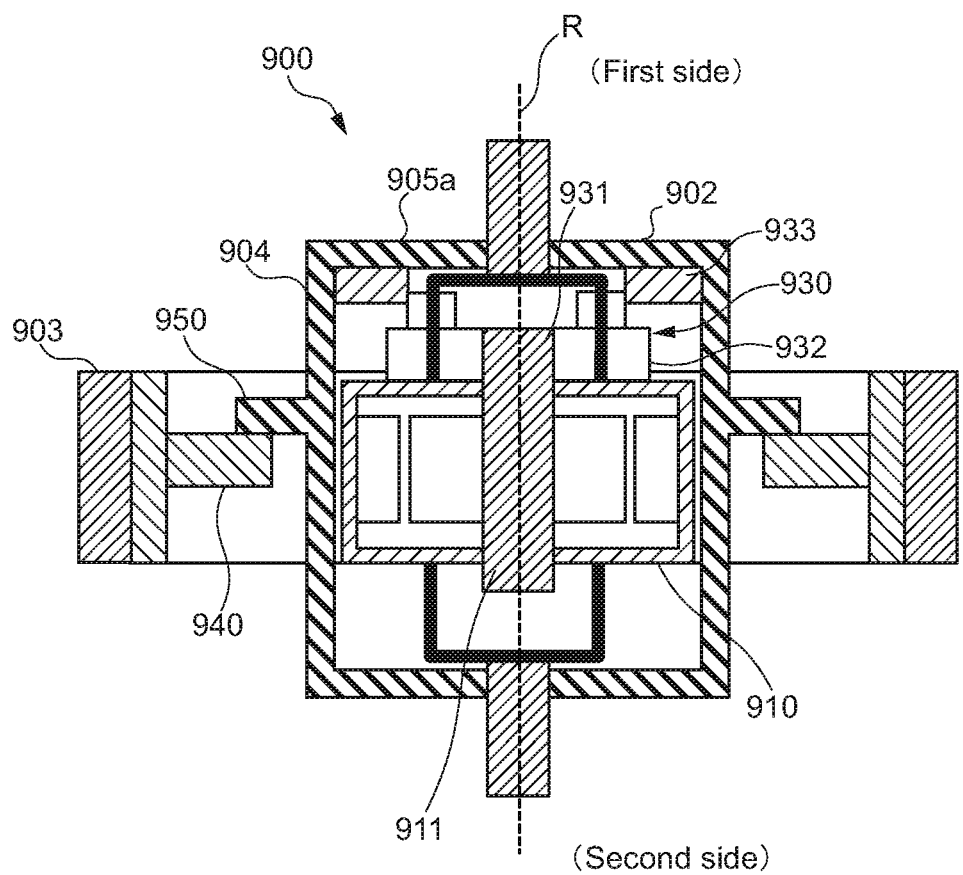
FIG. 9 is a schematic diagram showing a configuration example of an in-wheel motor drive apparatus given as Comparative Example.

FIG. 9 is a schematic diagram showing a configuration example of an in-wheel motor drive apparatus given as Comparative Example. In this in-wheel motor drive apparatus 900, a motor 910 and a gear mechanism 930 are housed inside a housing 902. Then, a wheel 940 is connected to a protruding portion 950 that protrudes from an outer peripheral surface 904 of the housing 902 to the outside.

The gear mechanism 930 includes a sun gear 931 connected to a rotational shaft 911 of the motor 910, planetary gears 932 that are engaged with the sun gear 931, and an internal gear 933 that is engaged with the planetary gears 932. The internal gear 933 includes a flat plate member having a circular shape centered on the rotation center axis R, gear teeth being formed on the center of the flat shape member. The internal gear 933 is connected to the inner surface side of a flat surface portion 905a of the housing 902 on the first side.

When the rotational shaft 911 of the motor 910 rotates, the rotational force thereof is decelerated and output from the internal gear 933. The decelerated rotational force causes the housing 902 to rotate, and the wheel 940 rotates integrally with the housing 902. As a result, a tire 903 supported by the wheel 940 is driven to rotate.

In the in-wheel motor drive apparatus 900 given as Comparative Example, the housing 902 functions as a hub, and the motor 910 and the gear mechanism 930 are housed in the hub. Then, by causing the hub to rotate, the wheel 940 connected to the hub rotates. Therefore, the wheel 940 is not directly connected to the gear included in the gear mechanism 930. Further, the wheel 940 does not function as a part of the hub (housing 902).

In the in-wheel motor drive apparatus 900 given as Comparative example, the housing 902 is included in the path through which the rotational force generated by the motor 910 is transmitted. Therefore, there is a possibility that the accuracy of transmitting the rotational force is reduced. For example, in the case where the connection accuracy between the internal gear 933 and the housing 902 or the connection accuracy between the housing 902 and the wheel 940 is low, the accuracy of transmitting the decelerated rotational force is reduced. As a result, the drive accuracy of the tire 903 is reduced.

Further, in the in-wheel motor drive apparatus 900 given as Comparative Example, since the internal gear 933 is connected to the inner surface side of the housing 902, it is difficult to check, when assembling the hub, the engagement between the planetary gears 932 and the internal gear 933. This is because the housing 902 covers the engagement portion between the planetary gears 932 and the internal gear 933. As a result, the assemblability of the in-wheel motor drive apparatus 900 is very poor. Further, there is a high possibility that engagement failure (variation) of the gears occurs, and thus, also drive accuracy is reduced.

On the other hand, the in-wheel motor drive apparatus 100 according to this embodiment, the wheel 40 and the internal gear 33 included in the gear mechanism 30 are directly connected to each other. This makes it possible to reduce the number of components included in the path through which the rotational force is transmitted. As a result, it is possible to suppress the reduction in drive accuracy due to the reduction in the accuracy of connecting components.

Further, in the case of assembling the gear mechanism 30, it is possible to proceed with the work while sufficiently checking the engagement state of the sun gear 31, the planetary gears 32, and the internal gear 33. As a result, it is possible to easily assemble a gear with low backlash/high precision, which results in favorable engagement and reduction in noise.

Further, also the internal gear 33 and the wheel 40 can be connected to each other while sufficiently checking the connection state, and then, the first cover 50a can be placed. As a result, the assemblability of the in-wheel motor drive apparatus 100 becomes very favorable. Further, it is possible to sufficiently prevent engagement failure of gears from occurring, and exhibit high drive accuracy.

Examples of an in-wheel motor drive apparatus having a small diameter include an apparatus of a direct motor system. The direct motor system is a system in which the rotational force of a motor is directly transmitted to a wheel using a magnet or the like to cause a tire to be driven to rotate. In this direct motor system, there is a problem that it is necessary to increase the output of the motor in order to realize high output, which makes the apparatus larger/heavier.

In this embodiment, since the rotational force can be decelerated and output by the gear mechanism 30, it is possible to obtain high output by the small motor 10 and realize downsizing/weight reduction of the apparatus. That is, by applying the present technology, it is possible to realize the in-wheel motor drive apparatus 100 that is small/lightweight, has high output, is capable of exhibiting high drive accuracy, and has favorable assemblability.

Other Embodiments

The present technology is not limited to the embodiment described above, and other various embodiments can be realized.

The configuration of the in-wheel motor drive apparatus 100 shown in FIG. 2 to FIG. 8 is merely an embodiment, and other arbitrary configurations may be adopted for the overall shape and the respective units without departing from the essence of the present technology. For example, the number of gears included in the gear mechanism, the number of teeth, the outer diameter, the deceleration ratio, and the like may be arbitrarily determined, and a configuration other than the planetary gear mechanism may be adopted. An arbitrary gear mechanism capable of decelerating the rotational force generated by the generation unit and transmitting the decelerated rotational force may be configured as a gear unit.

Also the configuration of the motor is not limited. For example, an outer rotor type motor or the like may be adopted. For example, a gear may be directly attached to a rotor included in the outer rotor type motor, and a rotational force of the rotor may be decelerated and transmitted by the gear mechanism. That is, a configuration in which no rotational shaft is used can be adopted. Note that as the generation unit that generates a rotational force, a device other than motor may be used.

Further, in the above, the motor, the gear mechanism, the housing, the wheel, the tire, and the like are configured to be coaxial with reference to the rotation center axis. The present technology is not limited thereto, and another arbitrary configuration may be adopted. Note that configuring the respective units coaxially is advantageous for downsizing the apparatus.

Also the configuration of the wheel unit may be arbitrarily designed. For example, spokes or the like are provided on the outer peripheral surface of the wheel, and a tire support portion centered on the rotation center axis is formed at the tip thereof. Then, the tire may be connected to the tire support portion. That is, the present technology is applicable also to a drive wheel that uses spokes or the like and has a large diameter.

Further, in the above, the wheel and the first and second covers constituting the housing integrally rotate. The present technology is not limited thereto, the wheel may be rotatably connected to the first and second covers, and only the wheel may rotate.

In the above, although a kick skater has been described as an example of a moving object, the type and the like of the moving object are not limited and the present technology is applicable to an arbitrary moving object including a drive wheel. For example, examples of the moving object include an automobile, an electric car, a hybrid electric vehicle, a motorcycle, a bicycle, personal mobility, an autonomous mobile robot, a construction machine, and an agricultural machine (tractor).

In the present disclosure, the terms "center", "equal", "parallel", "coaxial", "direction along", and the like are concepts including "substantially center", "substantially equal", "substantially parallel", "substantially coaxial", and "direction substantially along". For example, they include the states withing the range of ±10% with reference to "completely center", "completely equal", "completely parallel", "completely coaxial", and "direction completely along".

At least two features of the above-mentioned features according to the present technology may be combined. Specifically, various features described in each embodiment may be arbitrarily combined without distinguishing the embodiments with each other. Further, the various effects described above are merely examples and are not limited, and additional effects may be exerted.

It should be noted that the present technology may take the following configurations.

(1) A drive apparatus, including:

a generation unit that generates a rotational force acting around a predetermined axis as a center of rotation;

a gear unit that includes one or more gears, decelerates the generated rotational force, and transmits the decelerated rotational force;

a rotation unit that includes a wheel unit and a tire, the wheel unit being directly connected to a gear included in the gear unit and being caused to rotate by the decelerated rotational force, the tire being supported by the wheel unit; and a housing unit that houses the generation unit by a pair of cover units divided in an axial direction of the predetermined axis.

(2) The drive apparatus according to (1), in which the pair of cover units are connected to at least one of the wheel unit or the gear directly connected to the wheel unit to house the generation unit.

(3) The drive apparatus according to (1) or (2), in which the wheel unit rotates around the predetermined axis as a center of rotation.

(4) The drive apparatus according to any one of (1) to (3), in which the generation unit includes a rotational shaft and generates the rotational force by causing the rotational shaft to rotate, the gear unit includes a first gear and a second gear, the first gear being connected to the rotational shaft, the second gear outputting the decelerated rotational force, and the wheel unit includes a connection unit directly connected to the second gear.

(5) The drive apparatus according to (4), in which the gear unit includes a sun gear that is the first gear, an internal gear that is the second gear, and a plurality of planetary gears engaged with the sun gear and the internal gear, and the connection unit is directly connected to the internal gear.

(6) The drive apparatus according to any one of (1) to (5), in which the wheel unit has an outer peripheral surface having a cylindrical shape centered on the predetermined axis, and the tire is connected to the outer peripheral surface.

(7) The drive apparatus according to any one of (1) to (6), in which the wheel unit functions as a part of the housing unit.

(8) The drive apparatus according to any one of (1) to (7), in which the housing unit includes a first cover unit and a second cover unit, the first cover unit being connected to the wheel unit on a first side in the axial direction of the predetermined axis, the second cover unit being connected to the wheel unit on a second side opposite to the first side.

(9) The drive apparatus according to any one of (1) to (8), in which the housing unit rotates integrally with the wheel unit.

(10) The drive apparatus according to any one of (1) to (9), in which the housing unit has an outer peripheral surface having a cylindrical shape centered on the predetermined axis, and the tire is disposed along the outer peripheral surface of the housing unit.

(11) The drive apparatus according to any one of (1) to (10), in which the drive apparatus is configured as an in-wheel motor drive apparatus.

(12) The drive apparatus according to any one of (1) to (11), in which
the generation unit is a motor including a rotational shaft, generates the rotational force by causing the rotational shaft to rotate, and is configured as an in-wheel motor.

(13) A moving object, including:
a generation unit that generates a rotational force acting around a predetermined axis as a center of rotation;
a gear unit that includes one or more gears, decelerates the generated rotational force, and transmits the decelerated rotational force;
a rotation unit that includes a wheel unit and a tire, the wheel unit being directly connected to a gear included in the gear unit and being caused to rotate by the decelerated rotational force, the tire being supported by the wheel unit;
a housing unit that houses the generation unit by a pair of cover units divided in an axial direction of the predetermined axis; and
a control unit that controls generation of the rotational force by the generation unit.

REFERENCE SIGNS LIST

R rotation center axis
2 housing
3 tire
4 outer peripheral surface of a housing
10 motor
11 rotational shaft
30 gear mechanism
31 sun gear
32 planetary gear
33 internal gear
40 wheel
50a first cover
50b second cover
100 in-wheel motor drive apparatus
500 kick skater
520 controller

The invention claimed is:

1. A drive apparatus, comprising:
a generation unit configured to generate a rotational force that acts around a specific axis as a center of rotation;
a gear unit that includes a first gear, wherein
the first gear includes:
a flat surface portion,
a side surface portion that extends from an edge of the flat surface portion in an axial direction of the specific axis, and
a flange portion that extends from an end portion of the side surface portion in an outer peripheral direction, and
the gear unit is configured to:
decelerate the generated rotational force, and
transmit the decelerated rotational force;
a rotation unit that includes a wheel unit and a tire, wherein
the wheel unit is directly connected to the flange portion of the first gear included in the gear unit,
the wheel unit is rotatable by the decelerated rotational force, and
the tire is supported by the wheel unit; and
a housing unit that includes a pair of cover units divided in the axial direction of the specific axis, wherein the pair of cover units houses the generation unit.

2. The drive apparatus according to claim 1, wherein the pair of cover units is connected to at least one of the wheel unit or the first gear that is directly connected to the wheel unit.

3. The drive apparatus according to claim 1, wherein the wheel unit is rotatable around the specific axis as the center of rotation.

4. The drive apparatus according to claim 1, wherein
the generation unit includes a rotational shaft,
the generation unit is further configured to:
rotate the rotational shaft, and
generate the rotational force based on the rotation of the rotational shaft,
the gear unit further includes a second gear connected to the rotational shaft,
the first gear is configured to output the decelerated rotational force, and
the wheel unit includes a connection unit directly connected to the flange portion of the first gear.

5. The drive apparatus according to claim 4, wherein
the second gear is a sun gear,
the first gear is an internal gear,
the gear unit further includes a plurality of planetary gears engaged with the sun gear and the internal gear, and
the connection unit is directly connected to the flange portion of the internal gear.

6. The drive apparatus according to claim 1, wherein
the wheel unit includes an outer peripheral surface having a cylindrical shape centered on the specific axis, and
the tire is connected to the outer peripheral surface.

7. The drive apparatus according to claim 1, wherein the wheel unit functions as a part of the housing unit.

8. The drive apparatus according to claim 1, wherein
the pair of cover units includes a first cover unit and a second cover unit,
the first cover unit is connected to the wheel unit on a first side in the axial direction of the specific axis, and
the second cover unit is connected to the wheel unit on a second side opposite to the first side.

9. The drive apparatus according to claim 1, wherein the housing unit is integrally rotatable with the wheel unit.

10. The drive apparatus according to claim 1, wherein
the housing unit further includes an outer peripheral surface having a cylindrical shape centered on the specific axis, and
the tire is along the outer peripheral surface of the housing unit.

11. The drive apparatus according to claim 1, wherein the drive apparatus is configured as an in-wheel motor drive apparatus.

12. The drive apparatus according to claim 1, wherein
the generation unit is an in-wheel motor including a rotational shaft, and
the generation unit is further configured to:
rotate the rotational shaft, and
generate the rotational force based on the rotation of the rotational shaft.

13. A moving object, comprising:
a generation unit configured to generate a rotational force that acts around a specific axis as a center of rotation;
a gear unit that includes at least one gear, wherein
the at least one gear includes:
a flat surface portion,
a side surface portion that extends from an edge of the flat surface portion in an axial direction of the specific axis, and a flange portion that extends from an end portion of the side surface portion in an outer peripheral direction, and
the gear unit is configured to:
decelerate the generated rotational force, and
transmit the decelerated rotational force;
a rotation unit that includes a wheel unit and a tire, wherein
the wheel unit is directly connected to the flange portion of the at least one gear included in the gear unit,
the wheel unit is rotatable by the decelerated rotational force, and
the tire is supported by the wheel unit;
a housing unit that includes a pair of cover units divided in the axial direction of the specific axis, wherein the pair of cover units houses the generation unit; and
a control unit configured to control the generation of the rotational force by the generation unit.

* * * * *